Figure 1:
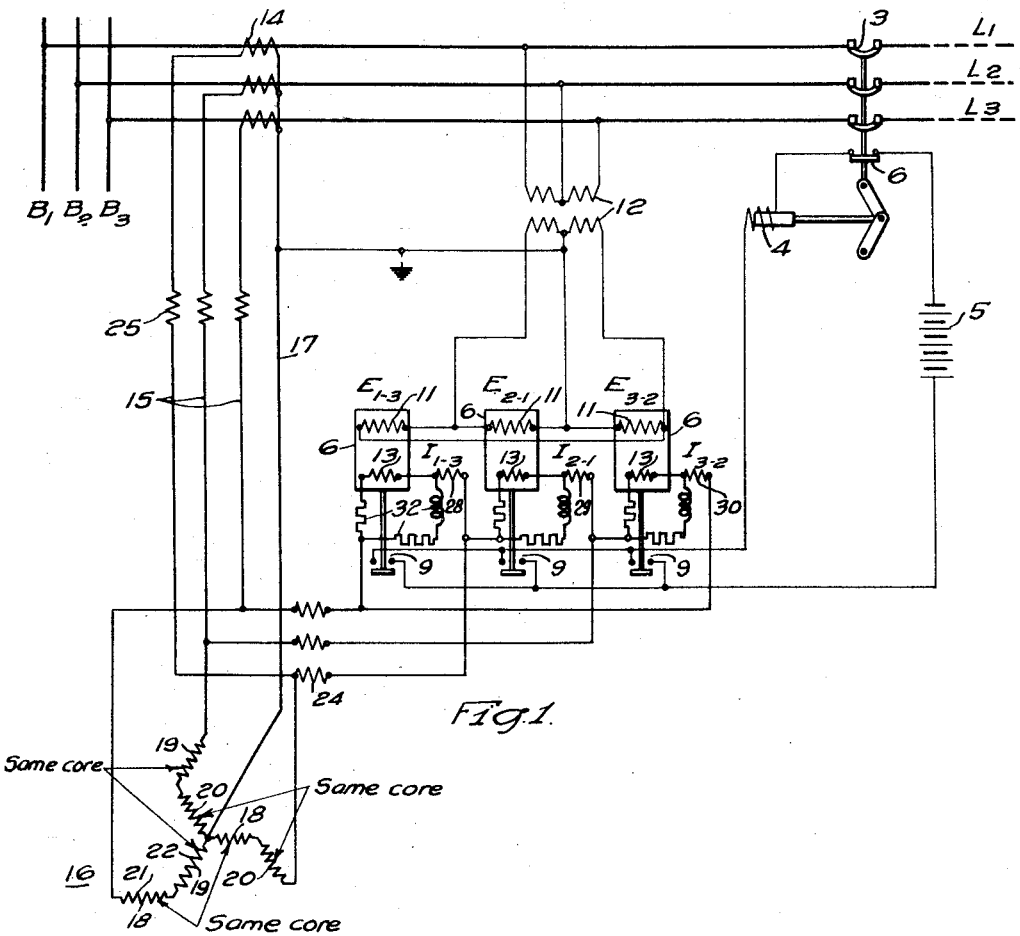

Sept. 13, 1932. W. A. LEWIS 1,877,139
CURRENT TRANSFORMER CONNECTION FOR RELAY OPERATIONS
Filed May 1, 1930

INVENTOR
William A. Lewis.
BY
Wesley G. Carr
ATTORNEY

Patented Sept. 13, 1932

1,877,139

UNITED STATES PATENT OFFICE

WILLIAM A. LEWIS, OF WILKINSBURG, PENNSYLVANIA, ASSIGNOR TO WESTINGHOUSE ELECTRIC & MANUFACTURING COMPANY, A CORPORATION OF PENNSYLVANIA

CURRENT TRANSFORMER CONNECTION FOR RELAY OPERATION

Application filed May 1, 1930. Serial No. 448,990.

My invention relates to current transformer connections for relay operation, and it has particular relation to the derivation of delta-phase currents for the proper energization of relays which respond to the line-to-line faults on a three-phase transmission line.

As mentioned in an application of S. L. Goldsborough, Serial No. 448,937, filed May 1, 1930, assigned to the Westinghouse Electric and Manufacturing Company, the so-called "balance point" of an impedance relay which responds to line-to-line faults is different for different types of faults, being 15% farther away for three-phase faults than single-phase line-to-line faults. Thus, if the relay responds to single-phase line-to-line faults at distances up to 75% of the length of the line-section in which the relay is located, it will respond to three-phase short-circuits up to distances as far as 86.3% of the length of the line-section, if the relays are energized, as heretofore, by line currents and by delta voltages.

In an application of L. S. C. Tippett, Serial No. 448988, filed May 1, 1930, assigned to the Westinghouse Electric and Manufacturing Company, it has been pointed out that such impedance relays will always balance to the same point, regardless of the type of line-to-line fault, if its current coils are supplied with delta currents, and means for doing this were shown, comprising a delta connection of the current transformer and a star connection of the current coils of the relay-elements which respond to line-to-line faults.

My invention relates to alternative means for securing this delta-current energization of the current coils of relays which respond to line-to-line faults.

According to my invention I am enabled to use a star connection of the current transformer with a delta connection of the relay-coils which are to be traversed by delta-phase currents. Heretofore, this has been impossible because, when line-to-ground faults occur on the transmission system, the current transformers are traversed by zero-phase-sequence current components, as explained in a series of articles by Wagner and Evans in The Electric Journal, March, 1928, pages 151–157; April, 1928, pages 194–197; June, 1928, pages 307–311; July, 1928, pages 359–362; September, 1929, pages 425–431; and December, 1929, pages 571–581. This may briefly be explained by stating that unequal line currents in a three-phase line may always be resolved into three groups of symmetrical components, to wit, a positive-phase-sequence component of three equal currents displaced in phase by 120°, a negative-phase-sequence component of three equal currents displaced in phase by 120° but in the opposite phase sequence, and a zero-phase-sequence component of three equal currents in phase with each other.

It will thus be seen that, with a star-connected current transformer having only delta-connected apparatus in its secondary circuit, there will be no return path for the flow of the three equal in-phase, zero-phase-sequence current components in the secondary windings of the current transformers. The current transformers will then operate precisely as if they were open circuited, insofar as the zero-phase-sequence currents are concerned, so that any zero-phase-sequence currents flowing in the line will become magnetizing current for the transformer, resulting in a high voltage between the star point of the current transformer and the three terminal leads thereof, and usually resulting, also, in saturation of the current transformer cores. It has thus been impossible, heretofore, to derive delta-phase currents from star-connected current transformers.

According to my invention this difficulty is obviated by the utilization of a small interconnected star transformer such as that which was described for connection across the transmission line itself, as distinguished from any particular current transformer connection thereof, in one of the above-mentioned Wagner and Evans articles in The Electric Journal, December, 1929, volume 26, page 574. This consists of three small one-to-one transformers connected so that the zero-phase-sequence currents neutralize each other magnetically, so that low impedance is offered to the flow of said zero-sequence currents. On the other hand, a small transformer or set of transformers is a substantially infinite impedance for the positive or negative phase-sequence components of the current, since it permits only the negligibly small magnetizing currents to flow in these phase-sequence components.

A further object of my invention is to provide, by means of the same star-connected transformers which are shunted by the interconnected star auxiliary transformers and which supply current to delta-connected current-responsive devices, additional series-connected current-responsive devices which need to be responsive to the line currents precisely as they are in the line, and/or additional series-connected current-responsive devices which need to be responsive to line currents from which the zero-phase-sequence component has been removed.

Figure 2:
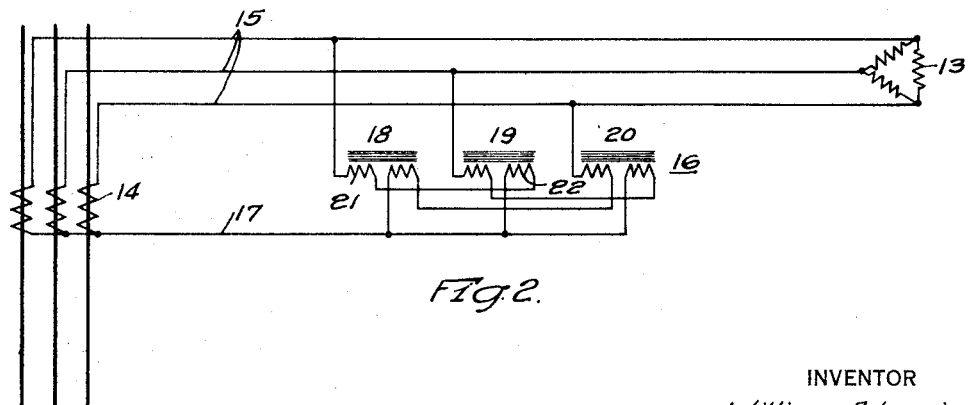

With the foregoing and other objects in view, my invention consists in the circuits and apparatus hereinafter described and claimed and illustrated in the accompanying drawing, wherein Figure 1 is a diagrammatic view of the circuits and apparatus embodying my invention in a preferred form, and Fig. 2 is a different diagrammatic representation of a portion of the circuits and apparatus shown in Fig. 1.

In Fig. 1 my invention is shown applied to a transmission line $L_1$, $L_2$ and $L_3$ which is connected to a bus $B_1$, $B_2$ and $B_3$ and is provided with a circuit breaker 3 having a trip coil 4 which is energized from a storage battery 5 through an auxiliary switch contact 6 on the circuit breaker. The circuit of the trip coil 4 is adapted to be completed by means of suitable relay equipment, of which only the barest suggestion is contained in my drawing, which shows, by way of illustration or suggestion, three impedance-responsive relay-elements 6 having normally open contacts 9 which are connected in parallel between the terminal of the trip coil 4 and the terminal of the battery 5. The relay-elements 6 are provided with voltage coils 11 which are connected in delta across a potential transformer 12 which is suitably energized from the line, so that the relay voltage coils are supplied with the delta voltages $E_{1-3}$, $E_{2-1}$ and $E_{3-2}$. The three impedance relays 6 are likewise provided with current coils 13 which are connected in delta and are energized from a star-connected current transformer 14 in accordance with my invention. The three phase terminals of the current transformer are connected to the three terminals of the delta connection which includes the current coils 13 by means of three conductors 15.

Connected across the three phase conductors 15 of the star-connected transformer 14 is a grounding transformer illustrated in the drawing as being a small interconnected star transformer indicated in its entirety at 16 and having its neutral or star point connected to the star point of the current transformers 14 by means of a conductor 17.

As shown more clearly in Fig. 2, the interconnected star auxiliary transformer 16 comprises three one-to-one ratio single phase transformers 18, 19 and 20 so connected that the zero-phase-sequence current from each of the three conductors 15 passes first through a primary winding 21 of one auxiliary transformer, as 18, then in reverse direction through the secondary winding 22 of the next adjacent auxiliary transformer, as 19, and thence, by means of the conductor 17, to the star point of the current transformer 14.

In the small interconnected star transformer, which is sometimes called a zig-zag transformer, a path of low impedance is thus provided for the zero-sequence component of the current in the secondary windings of the current transformers 14, because the two coils on the same core of each of the auxiliary transformers 18 to 20 are so arranged that they can carry equal and opposite components of current without any appreciable voltage drop. Unless the currents in the two coils on the same core are equal and opposite, the impedance of the auxiliary transformer between the current transformer leads 15 and the common return path 17 is very high. The positive and negative sequence currents in the three current transformer main leads 15 are 120° out of phase, instead of being in phase, so that the impedance of the zig-zag transformer to positive and negative sequence currents is very high, permitting, in effect, the flow of only magnetizing currents which may be made negligibly small in comparison with the total currents of the current transformers 14. The zig-zag transformer connection is thus substantially an open circuit with respect to the positive and negative sequence currents and is substantially a short circuit with respect to the zero-sequence currents, thus by-passing the latter and providing a suitable low-impedance return path therefor, thereby avoiding the evils heretofore pointed out in connection with the problem of obtaining delta-phase currents from star-connected current transformers.

The system of connections which I have just described accomplishes the same effects as that which was obtained on the aforesaid Tippett application by connecting the current transformers in delta and the relay current coils in star.

My current transformer connection has certain additional advantages, however, in particular cases, especially when the current transformers are of sufficient capacity to operate other instruments and relays than the one set of delta-connected relays. As shown in Fig. 1, a set of series-connected current-responsive devices responding to line currents from which the zero-phase-sequence component has been removed are connected in series circuit relation to the current-transformer conductors 15 between the shunt-connected, interconnected-star transformer windings 16 and the delta-connected current-responsive devices 13, as indicated at 24. Some types of directional relay-elements require this type of current response. In like manner, relays of other types, and instruments, which require line current for their operation, may be connected in series with the conductors 15 between the current transformers 14 and the inter-connected star transformers 16, as indicated at 25.

The use of delta-phase currents will generally be necessary in applications utilizing the high-speed impedance relays, or, in general, distance-responsive relays, of modern relaying systems in which stability is maintained by means of the quick clearing of faults, as set forth in an application of R. D. Evans, et al., Serial No. 403,390, filed October 30, 1929, and assigned to the Westinghouse Electric and Manufacturing Company. With the system of connections which I have described above the delta-connected current coils of distance-responsive relays may be added to existing installations without change of current transformers or other relays or instruments which are now fed from the set of star-connected current transformers.

If additional delta-phase current-responsive devices are to be energized, in addition to the current coils of the impedance relays 6, 7 and 8, these may be added in the respective delta circuits, as indicated at 28, 29 and 30, so that these devices are energized by the delta currents $I_{1-3}$, $I_{2-1}$ and $I_{3-2}$, respectively, as indicated on the drawing.

Some or all of the current-responsive devices, such as the current coils 13 of the impedance relays, may be provided with so-called transient shunts 32, for by-passing the direct-current transient of asymmetrical fault currents, as set forth in an application of L. N. Crichton Serial No. 422,965, filed January 23, 1930, and assigned to the Westinghouse Electric and Manufacturing Company. Whenever such devices are utilized, they will be regarded as an integral part of the current-responsive device which requires to be energized by delta-phase current, and the terminology of the claims is to be interpreted with this explanation in mind.

While I have shown, and carefully described, my invention in accordance with the best mode in which I now contemplate applying the principles thereof, it will be apparent that many modifications and changes may be made without departing from the spirit of my invention. I desire, therefore, that the appended claims shall be accorded the broadest construction consistent with their language and the prior art.

I claim as my invention:

1. The combination with a three-phase line, of a set of star-connected current transformers, a set of delta-connected current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a set of interconnected-star transformer windings connected across said conductors, with the neutral point of said windings connected to the neutral point of said current transformers, said interconnected-star transformed windings having three pairs of in-phase windings mounted non-inductively on three cores, respectively.

2. The invention as defined in claim 1, characterized by a set of series-connected current-responsive devices responding to line currents from which the zero-phase-sequence component has been removed connected in series circuit relation to said conductors between said shunt-connected interconnected-star transformer windings and said delta-connected current-responsive devices.

3. The invention as defined in claim 1, characterized by a set of series-connected current-responsive devices responsive to the line currents precisely as they are, in the line, said set of series current-responsive devices being connected in series circuit relation to said conductors between said shunt-connected interconnected-star transformer windings and said current transformers.

4. The invention as defined in claim 1, characterized by a set of series-connected current-responsive devices responding to line currents from which the zero-phase-sequence component has been removed connected in series circuit relation to said conductors between said shunt-connected interconnected-star transformer windings and said delta-connected current-responsive devices, and a second set of series-connected current-responsive devices responsive to the line currents precisely as they are, in the line, said second set of series current-responsive devices being connected in series circuit relation to said conductors between said shunt-connected interconnected-star transformer windings and said current transformers.

5. The combination with a three-phase line, of a set of star-connected current transformers, a set of delta-connected current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a set of three single-phase transformers each having a primary winding and a secondary winding, the primary windings being star connected and connected across said coductors, with the neutral point of said windings connected to the neutral point of said current transformers, and the secondary windings being so connected that the in-phase zero-phase sequence currents in the three transformers will neutralize each other and produce a substantially zero total voltage-drop to the flow of said zero-phase-sequence currents.

6. The invention as defined in claim 5, characterized by a set of series-connected current-responsive devices responding to line currents from which the zero-phase-sequence component has been removed connected in series circuit relation to said conductors between said shunt-connected primary windings and said delta-connected current-responsive devices.

7. The invention as defined in claim 5, characterized by a set of series-connected current-responsive devices responsive to the line currents precisely as they are, in the line, said set of series current-responsive devices being connected in series circuit relation to said conductors between said shunt-connected primary windings and said current transformers.

8. The invention as defined in claim 5, characterized by a set of series-connected current-responsive devices responding to line currents from which the zero-phase-sequence component has been removed connected in series circuit relation to said conductors between said shunt-connected primary windings and said delta-connected current-responsive devices, and a second set of series-connected current-responsive devices responsive to the line currents precisely as they are, in the line, said second set of series of current-responsive devices being connected in series circuit relation to said conductors between said shunt-connected primary windings and said current transformers.

9. The combination with a three-phase line, of a delta-connected current-responsive device and a star-connected current transformer delivering substantially all of its current except the zero-phase-sequence component to the three terminals of said delta-connected device, characterized by the fact that said current transformers are substantially short-circuited with respect to said zero-phase-sequence component by means of three one-to-one-ratio single-phase auxiliary transformers so connected that the zero-phase-sequence current from each of the three conductors between the current transformer and the current-responsive device passes first through a primary winding of one auxiliary transformer, then in reverse direction through the secondary winding of the next adjacent auxiliary transformer, and thence to the star point of the current transformer.

10. The combination with a three-phase line, of a set of star-connected current transformers, a set of current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a set of interconnected-star transformer windings connected across said conductors, with the neutral point of said windings connected to the neutral point of said current transformers, said interconnected-star transformer windings having three pairs of in-phase windings mounted non-inductively on three cores, respectively.

11. The invention, as defined in claim 10, characterized by a set of series-connected current-responsive devices responsive to the line currents precisely as they are, in the line, said set of series current-responsive devices being connected in series-circuit relation to said conductors between said shunt-connected interconnected-star transformer windings and said current transformers.

12. In combination with a polyphase circuit to be protected, a current transformer associated with each of the phase conductors thereof, the secondary windings of said transformers being star-connected and having a conductor extending from the neutral point thereof, relays having current-responsive windings respectively connected for energization in delta from said secondary windings, and means associated with each relay and said neutral conductor for by-passing zero-sequence currents from said current-responsive windings.

13. In combination with a polyphase circuit to be protected, a current transformer associated with each of the phase conductors thereof, the secondary windings of said transformers being star-connected and having a conductor extending from the neutral point thereof, relays having current-responsive windings respectively connected for energization in delta from said secondary windings, and a grounding transformer connected across the terminals of said star-connected secondary windings, said grounding transformer having a neutral connection connected to the neutral-point conductor of said secondary windings.

14. In combination with a polyphase circuit to be protected, a current transformer associated with each of the phase conductors thereof, the secondary windings of said transformers being star-connected and having a conductor extending from the neutral point thereof, relays having current-responsive windings respectively connected for energization in delta from said secondary windings, and a zero-sequence filter connected across the terminals of said star-connected current transformers.

15. The combination with a three-phase line, of a set of star-connected current transformers, a set of delta-connected current-responsive devices, and means whereby substantially all of the current from the current transformers is supplied to the terminals of said current-responsive devices except the zero-phase-sequence component, said means including three conductors connected between the terminals of said current-responsive devices and the respective terminals of said current transformers, and a grounding transformer connected across the terminals of said star-connected current transformers, said grounding transformer having a neutral connection connected to the neutral point of said star-connected current transformers.

16. The combination with a three-phase line, of a delta-connected current-responsive device and a star-connected current transformer delivering substantially all of its current except the zero-phase-sequence component to the three terminals of said delta-connected device, characterized by the fact that said current transformers are substantially short-circuited with respect to said zero-phase-sequence component by means of a zero-sequence filter.

17. The combination with a three-phase line of a set of star-connected current transformers, a set of delta-connected current-responsive devices, three conductors connected between the terminals of said current-responsive devices and the respective terminals of said current transformers, and a set of transformers so connected, across said conductors and to the neutral point of said star-connected current transformers, as to present substantially a short-circuit path for the zero-sequence currents and a very high impedance for positive- and negative-sequence currents.

In testimony whereof, I have hereunto subscribed my name this 26th day of April, 1930.

WILLIAM A. LEWIS.